United States Patent [19]

Takuma

[11] Patent Number: 4,685,287
[45] Date of Patent: Aug. 11, 1987

[54] COMPRESSOR SYSTEM AND START-UP METHOD THEREFOR

[75] Inventor: Yoshiyuki Takuma, Kobe, Japan
[73] Assignee: Mitsubishi Denki Kabushiki Kaisha, Tokyo, Japan
[21] Appl. No.: 800,028
[22] Filed: Nov. 20, 1985
[51] Int. Cl.$^4$ ............................................. F02C 7/26
[52] U.S. Cl. ................... 60/39.07; 60/39.142; 60/39.33
[58] Field of Search ............ 60/604, 39.07, 39.142, 60/39.33

[56] References Cited

U.S. PATENT DOCUMENTS

| | | | |
|---|---|---|---|
| 2,941,790 | 6/1960 | Compton et al. | 60/39.142 |
| 3,048,005 | 8/1962 | Egli et al. | 60/39.142 |
| 3,096,615 | 7/1963 | Zuhn | 60/606 |
| 3,423,927 | 1/1969 | Scherenberg | 60/606 |
| 3,775,971 | 12/1973 | Gadefelt | 60/606 |
| 4,004,947 | 1/1977 | Bloomfield . | |
| 4,299,087 | 11/1981 | Kullendorff et al. | 60/39.142 |

FOREIGN PATENT DOCUMENTS 58-56231 12/1982 Japan .

OTHER PUBLICATIONS

"Specification for Dispersed Fuel Cell Generator", Electric Power Research Institute, EM-2123, Research Project 1777-1, Nov., 1981.

Primary Examiner—Louis J. Casaregola
Attorney, Agent, or Firm—Leydig, Voit & Mayer

[57] ABSTRACT

A compressor system includes a compressor, a turbine for driving the compressor, and an auxiliary burner. Compressed air from an external source is supplied to drive the turbine during start-up. The air compressed by the compressor is then supplied to the auxiliary burner to drive the turbine and the compressed air from the external source is shut-off to keep the compressor system running only by the compressed air from the compressor itself.

5 Claims, 6 Drawing Figures

COMPRESSOR SYSTEM AND START-UP METHOD THEREFOR

BACKGROUND OF THE INVENTION

The present invention relates to a compressor system and a method for starting up the compressor system in which an auxiliary burner is used to drive a turbine, and a compressor is driven by the turbine to supply compressed air to the auxiliary burner when the compressor system is started up.

A compressor system of this kind is used to efficiently recover the exhaust gas energy of an air utilizing system without wasting it.

A fuel cell power plant system has the advantages that its efficiency is high in comparison with that of a conventional steam power plant and that it does not pollute the environment as much. A fuel cell power plant comprises a fuel cell body having electrodes of air and fuel and a layer of electrolyte, a reformer for reforming a hydrocarbon fuel such as natural gas and supplying a hydrogen gas as fuel to the fuel cell body, and a compressor system for supplying air to the fuel cell body and the reformer. The performance of the fuel cell body is improved as the pressures of the reacting gases increase. Therefore, the operating pressures of the reacting gases are commonly maintained within a range of 4 to 6 kg/cm$^2$. The compressor system comprises a turbine receiving the combustion exhaust gas from the reformer and the surplus air from the air electrode of the fuel cell body, and a compressor coaxially connected to the turbine to supply compressed air to the air utilizing system having the fuel cell body and the reformer. The exhaust gas energy is thus collected within the plant system, improving the efficiency of the plant system.

In such a fuel cell power plant system, it is necessary to start up the compressor system when the plant system is started up. However, since the exhaust gas as a driving source cannot be obtained at the initial stage, it is necessary to start up the compressor system by introducing energy from an external source.

A method for solving the above problem is disclosed in Japanese Patent Application No. 59-16685. FIG. 1 shows a compressor system disclosed therein. A fuel cell system 1 comprises a fuel cell body, a reformer and a burner. A compressor assembly 2 comprises a turbine 2a and a compressor 2b coaxially connected to the turbine 2a. The compressor 2b supplies compressed air to the fuel cell system 1 through an air supply conduit 5 in which a regulating valve 6 is disposed to adjust the air flow therethrough.

When the compressor assembly 2 is started up, a change-over valve 4 in an air suction conduit 3 and the regulating valve 6 are closed. A change-over valve 14 in an air inlet conduit 13 is opened to supply air to the compressor 2b, and a regulating valve 10 in a burner conduit 8 is opened to supply compressed air to an auxiliary burner 9. At point in time A of FIG. 2, compressed air is supplied to the compressor 2b through the air inlet conduit 13 by a compressed air supply apparatus 12. The compressed air is then supplied to the auxiliary burner 9, and fuel is supplied from a fuel supply conduit 11 to the auxiliary burner 9. Then, the auxiliary burner 9 is ignited at point in time B to burn the mixture of fuel and compressed air, and the combustion gas is supplied to the turbine 2a. As the temperature of the combustion gas increases, its pressure increases and the compressor assembly 2 is started up at point in time C. When the temperature of the combustion gas has reached a predetermined operating temperature for the turbine 2a, the change-over valve 4 is opened, the operation of the compressed air supply apparatus 12 is stopped at point in time D, and the change-over valve 14 is closed. This state is a stand-by state, and in this state, compressed air can be supplied to the fuel cell system 1 by the compressor 2b at any time when necessary, by opening the regulating valve 6. Exhaust gas generated by the fuel cell system 1 is sent to the turbine 2a through an exhaust gas conduit 7.

In another conventional system such as the system disclosed in Japanese Laid-Open Patent Publication No. 58-12268, a conduit communicating with the atmosphere and having a regulating valve disposed along it is connected to the air supply conduit 5. The regulating valve serves to maintain the pressure of the air on the outlet side of the compressor 2b at a constant level irrespective of changes in the load applied to the fuel cell system 1.

In such a conventional system, after the auxiliary burner 9 has been ignited at point in time B, the compressor assembly 2 is started at point in time C by the energy of the exhaust gas from the auxiliary burner 9. However, such a system has the disadvantages that the combustion of the auxiliary burner 9 is not stable and the auxiliary burner 9 tends to be extinguished. Namely, to improve the combustion efficiency of the auxiliary burner 9, the exhaust gas generated by the combustion in the body of the auxiliary burner 9 is directly supplied to the turbine 2a through the exhaust gas conduit 7, and when the compressor assembly 2 is started up, the air pressures in the air supply conduit 5, the burner conduit 8, and the exhaust gas conduit 7 rapidly increase in a short time which may be less than a few seconds. Accordingly, the pressure in the auxiliary burner 9 rapidly increases during the combustion of the mixture so that the combustion of the combustion burner becomes unstable and the combustion burner tends to be extinguished. Therefore, the conventional system has the disadvantages that the running of the compressor assembly 2 cannot be kept stable during start-up. Furthermore, in this system, when the operation of the compressed air supply apparatus 12 is stopped and the compressor assembly 2 begins running on its own without an external source of compressed air, the pressure of the compressed air on the outlet side of the compressor 2b temporarily decreases which decreases the output power of the turbine and reduces the rotational speed of the compressor assembly. Accordingly, this system also has the disadvantages in that the operation of the compressor assembly 2 is not stable during start-up.

SUMMARY OF THE INVENTION

Therefore, an object of the present invention is to provide a compressor system and a method for starting up a compressor system in which a compressor assembly having a turbine and a compressor driven by the turbine can operate stably during start-up.

With the above object in view, the present invention resides in a compressor system comprising a compressor, a turbine connected to the compressor for driving it, a compressed air source capable of supplying compressed air sufficient for starting up the turbine, a first conduit connected between the compressed air source and the turbine for supplying the compressed air from the compressed air source to the turbine, an auxiliary burner connected in the first conduit between the compressed air source and the turbine, a bypass conduit connected in parallel with the auxiliary burner between the compressor and the turbine for bypassing the auxiliary burner, and control means for controlling the flow of compressed air such that the turbine is first driven only by the compressed air from said compressed air source supplied through the bypass conduit during start-up of the compressor, and the compressed air, together with air compressed by and supplied from the compressor, is supplied to the auxiliary burner after the compressor has been started, and that the compressed air source is shut off to keep the turbine running only on the compressed air supplied from the turbine-driven compressor.

The present invention also resides in a method for starting up a compressor system including a compressor, a turbine for driving the compressor, and an auxiliary burner for driving the turbine, comprising the steps of supplying compressed air to the turbine to start up the compressor to drive it at a speed for supplying a sufficient amount of compressed air to the turbine to keep it running, supplying the compressed air from the compressor to the auxiliary burner, and igniting the auxiliary burner to keep the compressor system running only by the compressed air from said auxiliary burner.

BRIEF DESCRIPTION OF THE DRAWINGS

The present invention will now be described with reference to the preferred embodiments thereof in conjunction with the accompanying drawings in which.

DETAILED DESCRIPTION OF THE PREFERRED EMBODIMENTS

Figure 1:
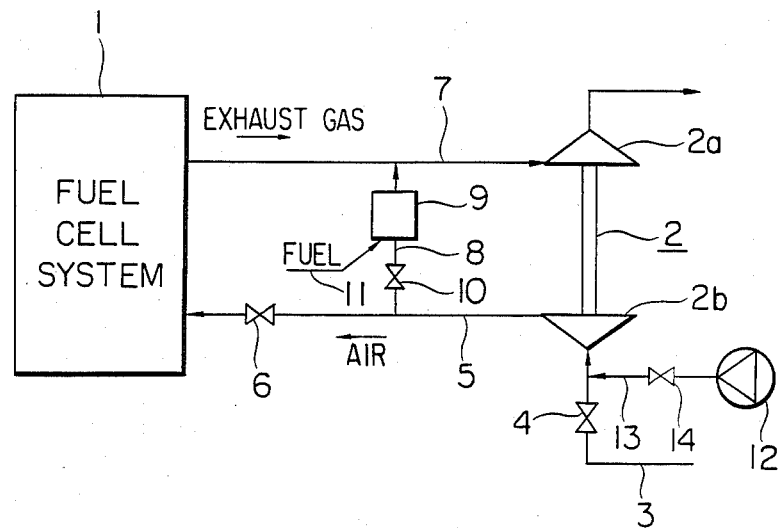
FIG. 1 is a schematic diagram of a conventional compressor system.
Figure 2:
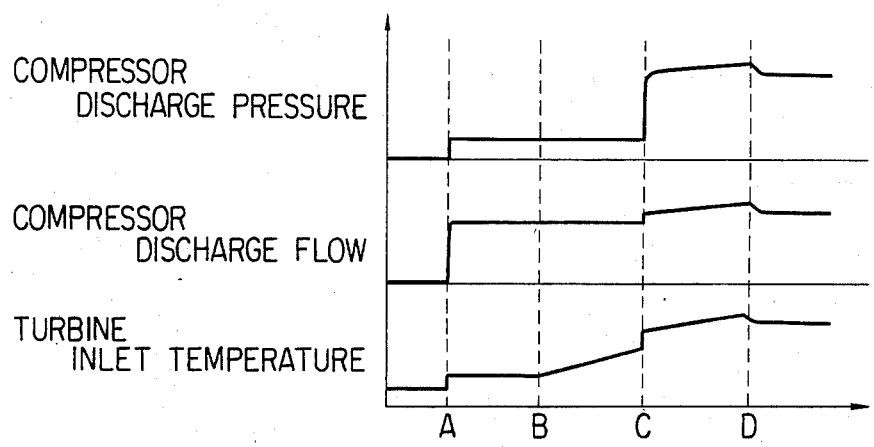
FIG. 2 is a graph showing the changes in the pressure and flow of the compressed air discharged from a compressor and the change in the temperature at the inlet of a turbine with respect to time in the starting process of the compressor assembly shown in FIG. 1.
Figure 3:
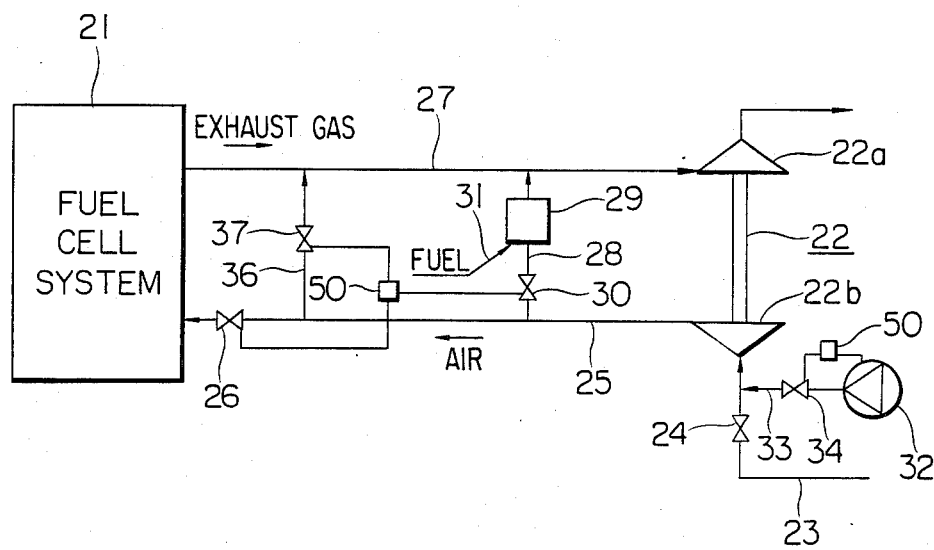
FIG. 3 is a schematic diagram of a compressor system according to one embodiment of the present invention.

FIG. 3 shows a compressor system according to the present invention which comprises a compressor assembly 22 having a turbine 22a and a compressor 22b coaxially connected to the turbine 22a. The turbine 22a is driven by exhaust gas from a fuel cell system 21 having a fuel cell body, a reformer, a burner, etc. The compressor 22b supplies compressed air to the fuel cell system 21. An air suction conduit 23 is disposed on the inlet side of the compressor 22b, and a change-over valve 24 is disposed in the air suction conduit 23 to control the air flow therethrough. An air supply conduit 25 which is connected between the compressor 22b and the fuel cell system 21 supplies compressed air from the compressor 22b to the fuel cell system 21. A regulating valve 26 is disposed in the air supply conduit 25 to adjust the air flow therethrough. A system exhaust gas conduit 27 is connected to the fuel cell system 21 and the turbine 22a to guide exhaust gas generated in the fuel cell system 21 to the turbine 22a. A burner conduit 28 is connected between the air supply conduit 25 and the exhaust gas conduit 27. An auxiliary burner 29 is disposed in the burner conduit 28. A regulating valve 30 is disposed in the burner conduit 28 to adjust the flow of air into the auxiliary burner 29. A fuel supply conduit 31 for supplying fuel to the auxiliary burner 29 is connected to the auxiliary burner 29. A compressed air supply apparatus 32 is connected to an air inlet conduit 33 to supply compressed air to the compressor 22b through an inlet conduit 33. A change-over valve 34 is disposed in the air inlet conduit 33 to control the air flow therethrough. The compressed air supply apparatus 32 has enough capacity to start up the compressor assembly 22, and comprises an electric blower, a compressor, a high pressure tank, or the like. A bypass conduit 36 for use during start-up of the compressor 22 branches from the air supply conduit 25 and connects to the system exhaust gas conduit 27. During start-up of the compressor assembly 22, all the air not passing through the auxiliary burner 29 is passed through bypass conduit 36. A regulating valve 37 is disposed in the bypass conduit 36 to adjust the air flow therethrough. A control device 50 is connected to the regulating valves 26, 30 and 37, the change-over valve 34, and the compressed air supply apparatus 32 to control the flow of the compressed air through these valves. Namely, by the control of the control device 50, the turbine 22a is first driven only by the compressed air from the compressed air supply apparatus 32 supplied through the bypass conduit 36 during start-up of the compressor 22b, and the compressed air from the compressed air supply apparatus 32, together with the air compressed by and supplied from the compressor 22b, is supplied to the auxiliary burner 29 after the compressor 22b has been started, and the compressed air supply apparatus 32 is shut off to keep the turbine 22a running only on the compressed air supplied from the compressor through the auxiliary burner 29. The compressor system according to the present invention comprises the compressor assembly 22, the air supply conduit 25, the system exhaust gas conduit 27, the bypass conduit 36 with the valve 37, the burner conduit 28 with the valve 30, the auxiliary burner 29, the air inlet conduit 33 with the valve 34, the compressed air supply apparatus 32, and the control device 50.

Figure 4:
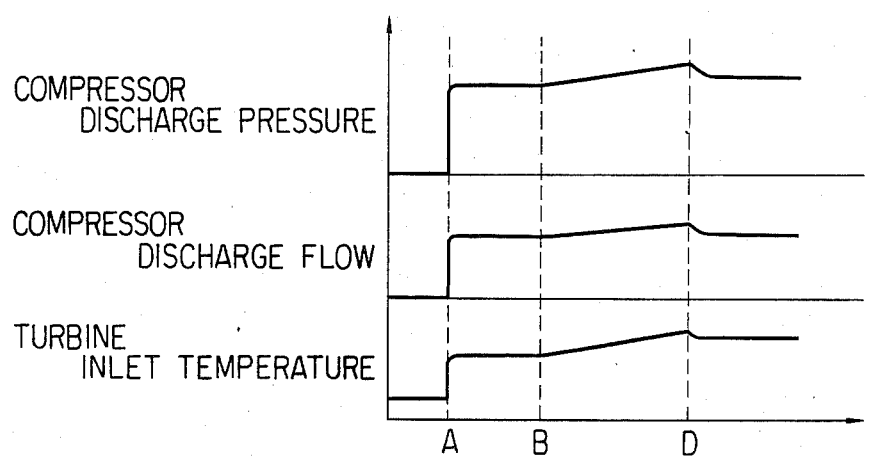
FIG. 4 is a graph showing the changes in the pressure and flow of the compressed air discharged from a compressor and the change in the temperature of the inlet of a turbine with respect to time in the starting process of the compressor assembly shown in FIG. 3.

When the system is started up, the change-over valve 24 and the regulating valves 26 and 30 are closed, while the change-over valve 34 and the regulating valve 37 are opened by the control device 50. Then the compressed air supply apparatus 32 is operated at point in time A shown in FIG. 4. The compressed air from the compressed air supply appparatus 32 is supplied to the turbine 22a via the compressor 22b, the air supply conduit 25, the bypass conduit 36 and the system exhaust gas conduit 27. The compressor assembly 22 is started up approximately at the same time as the compressed air supply apparatus 32, thereby increasing the pressure of the compressed air discharged from the compressor 22b. Thereafter, the regulating valve 30 is opened by the control device 50 to supply compressed air to the auxiliary burner 29, and fuel is supplied to the auxiliary burner 29 through the fuel supply conduit 31, thereafter igniting the auxiliary burner 29 at point in time B. The combustion exhaust gas of the auxiliary burner 29 flows together with the compressed air from the bypass conduit 36 through the system exhaust gas conduit 27 to the turbine 22a. The power of the turbine and the pressure of the air discharged from the compressor 22b increase as the temperature of the combustion gas entering the turbine 22a increases. When the temperature of the combustion gas has reached a predetermined operating temperature at which the compressor assembly 22 can continue running without the compressed air from the compressed air supply apparatus 32, the change-over valve 24 is opened and the operation of the compressed air supply apparatus 32 is stopped by the control device 50 at point in time D, and the change-over valve 34 is closed by the control device 50. From this position, the compressor system 22 continues to run entirely on the compressed air compressed by the compressor 22b itself. Thereafter, the regulating valve 26 is gradually opened with gradually closing the regulating valve 37 by the control device 50 so that the air flow from the compressor 22b is gradually directed from the bypass conduit 36 to the fuel cell system 21.

As stated above, the compressor assembly 22 is started up before the auxiliary burner 29 is ignited. Therefore, there is no rapid change in the air pressure in the auxiliary burner 29 after it is ignited. Its combustion is therefore stable and the auxiliary burner is not extinguished.

In the above embodiment, the compressed air supply apparatus 32 is connected to the inlet side of the compressor 22b, but the same effects can be obtained when the compressed air supply apparatus is connected to the air supply conduit 25 upstream of the bypass and burner conduits 36 and 28 but downstream of the compressor 22b.

Figure 5:
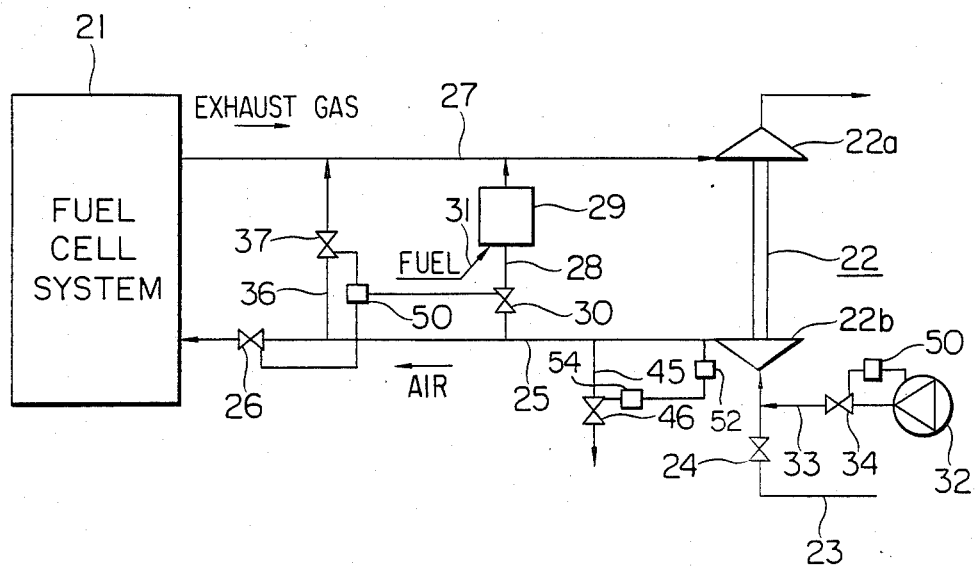
FIG. 5 is a schematic diagram of a compressor system according to another embodiment of the present invention.

FIG. 5 shows a second embodiment of the present invention. In this embodiment, a conduit 45 which communicates with the atmosphere branches from an air supply conduit 25 and is disposed on the outlet side of a compressor 22b upstream of a burner conduit 28 and a bypass conduit 36. A regulating valve 46 is disposed in the conduit 45 to adjust the air flow therethrough. The construction is otherwise similar to the construction shown in FIG. 3.

Figure 6:
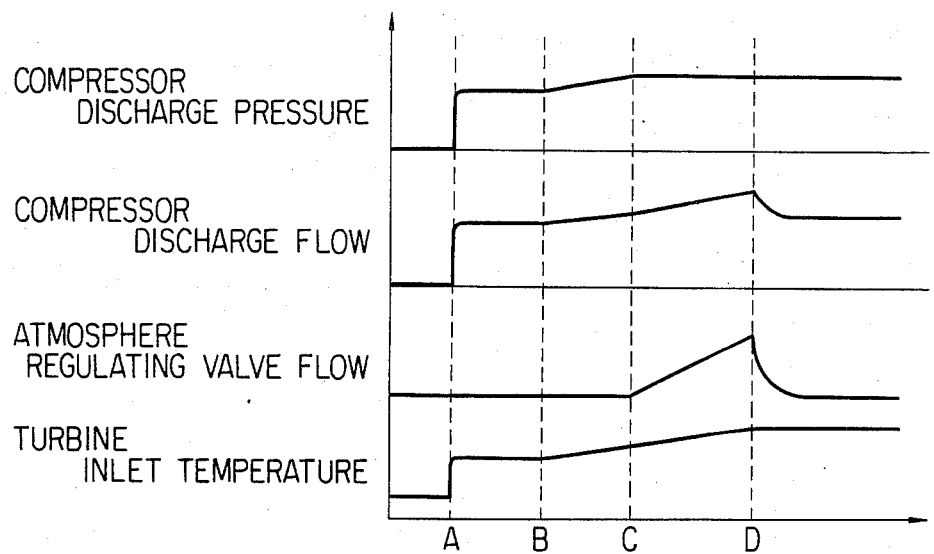
FIG. 6 is a graph showing the changes in the pressure and flow of the compressed air discharged from a compressor, the change in the air flow passing through an atmosphere regulating valve, and the change in the temperature of the inlet of a turbine with respect to time in the starting process of the compressor assembly shown in FIG. 5.

In the second embodiment, when the compressor system is started up, a change-over valve 24, regulating valves 26 and 30, and the regulating valve 46 are closed, and a change-over valve 34 and a regulating valve 37 are opened by the control device 50. A compressed air supply apparatus 32 is then operated by the control device 50 at point in time A of FIG. 6, and the compressed air from the apparatus 32 is supplied to the turbine 22a through the compressor 22b, the air supply conduit 25, the bypass conduit 36, and the exhaust gas conduit 27, thereby rotating the turbine. Thus the pressure of the compressed air from the compressor 22b rapidly increases for a short time when the compressor 22 is started up. In this state, the regulating valve 30 is opened by the control device 50 to supply air to the axiliary burner 29, and fuel is also supplied to the auxiliary burner 29 through a fuel supply conduit 31, thereafter igniting the auxiliary burner 29 at point in time B. As in the first embodiment, the power of the turbine 22a increases as the temperature of the exhaust gas entering the turbine 22a increases, thereby increasing the pressure of the compressed air discharged from the compressor 22b. A pressure sensor 52 is disposed on the outlet side of the compressor 22b to detect the outlet air pressure and a pressure controller 54 connected to the pressure sensor outputs a control signal to an aperture regulating mechanism for the regulating valve 46 so as to maintain the pressure of the compressed air at a predetermined rated pressure. When the pressure of the compressed air has reached the predetermined pressure at point in time C, the regulating valve 46 is opened by the pressure controller to maintain the pressure of the compressed air at a constant level. The size of the aperture of the regulating valve 46 is increased as the temperature of the inlet of the turbine 22a increases. Thus, the aperture of the regulating valve 46 is adjusted according to the increase in the power of the turbine 22a such that the pressure of the compressed air is maintained at a constant level.

As in the first embodiment, when the temperature of the inlet of the turbine 22a has reached a predetermined operating temperature, the change-over valve 24 is opened and the operation of the compressed air supply apparatus 32 is stopped by the control device 50, and the change-over valve 34 is closed by the control device 50. When the operation of the compressed air supply apparatus 32 stops at point in time D, the size of the aperture of the regulating valve 46 is reduced by the pressure controller so that the air pressure on the outlet side of the compressor 22b does not temporarily decrease, maintaining the air pressure at a constant level. Thus, there is no fluctuation in the pressure of the compressed air on the outlet side of the compressor 22b and therefore the rotational speed of the compressor assembly 22 does not temporarily decrease when the operation of the compressed air supply apparatus 32 stops. The combustion quantity of the auxiliary burner 29 or the temperature at the inlet of the turbine 22a at the time when the compressed air supply apparatus 32 stops is preferably set such that, after the stoppage of the compressed air supply apparatus 32, the pressure of the compressed air is maintained at a constant rated pressure and such that the regulating valve 46 is maintained to be completely closed or slightly opened for allowance. Thus the operation of the compressor assembly 22 is kept stable during the start-up of the compressor system. After the operation of the compressor assembly 22 is fully kept stable, the regulating valve 26 is gradually opened and the regulating valve 37 is gradually closed by the control device 50 to direct the air flow from the bypass conduit 36 to the fuel cell system 21.

In the above embodiments, the compressor system is used to provide air to a fuel cell system 21. However, the compressor system according to the present invention can be used to supply air to any type of air-utilizing system employing a turbine.

What is claimed is:

1. A compressor system comprising:
 a compressor;
 a turbine connected to drive said compressor;
 a compressed air source capable of supplying compressed air sufficient for starting the turbine;
 a first conduit connected for supplying compressed air from said source to said turbine;
 an auxiliary burner connected in said first conduit between said compressed air source and said turbine;

a bypass conduit connected in parallel with said auxiliary burner between said compressor and said turbine for bypassing said auxiliary burner, said bypass conduit having a connection means to said compressed air source; and control means for controlling the flow of compressed air such that said turbine is first driven only by compressed air from said compressed air source supplied through said bypass circuit and connection means during start-up of said compressor, and such that, after said compressor has been started, said turbine is driven by compressed air from said compressor supplied through said bypass conduit, together with air compressed by said compressor supplied to said auxiliary burner, said auxiliary burner then being fired and said compressed air source thereafter being shut off to keep said turbine running only on the compressed air from said compressor.

2. A compressor system as claimed in claim 1 wherein said control means comprises first and second regulating valves respectively disposed in the first and bypass conduits to adjust the air flow therethrough, the first regulating valve being disposed upstream of the auxiliary burner, and said compressed air source being disposed on the inlet side of the compressor.

3. A compressor system as claimed in claim 1 wherein said control means comprises first and second regulating valves respectively disposed in the first and bypass conduits to adjust the air flow therethrough, the first regulating valve being disposed upstream of the auxiliary burner, and said compressed air source being disposed on the outlet side of the compressor upstream of the first and bypass conduits.

4. A compressor system as claimed in claim 1 wherein said control means comprises means for maintaining the pressure of the compressed air on the outlet side of the compressor within a predetermined range after the ignition of the auxiliary burner.

5. A compressor system as claimed in claim 4 wherein said maintaining means comprises a regulating valve which communicates with the atmosphere and compensates for the reduction of the pressure of the compressed air on the outlet side of the compressor after the air supply of the compressed air source has stopped.

* * * * *